United States Patent [19]

Minamikawa et al.

[11] Patent Number: 5,733,521
[45] Date of Patent: Mar. 31, 1998

[54] PROCESS FOR PRODUCING A PURIFIED AQUEOUS HYDROGEN PEROXIDE SOLUTION

[75] Inventors: Yoshitsugu Minamikawa; Seishi Murakami; Masamichi Hattori, all of Yokkaichi, Japan

[73] Assignee: Mitsubishi Gas Chemical Company, Inc., Tokyo, Japan

[21] Appl. No.: 733,799

[22] Filed: Oct. 18, 1996

[30] Foreign Application Priority Data

Nov. 15, 1995 [JP] Japan ................... 7-296368

[51] Int. Cl.$^6$ ................................ C01B 15/01
[52] U.S. Cl. ................................ 423/584
[58] Field of Search ................................ 423/584

[56] References Cited

U.S. PATENT DOCUMENTS

| | | | |
|---|---|---|---|
| 3,012,860 | 12/1961 | Meeker et al. | 423/584 |
| 3,074,782 | 1/1963 | Meeker et al. | 423/584 |
| 3,294,488 | 12/1966 | Dunlop et al. | 423/584 |
| 3,305,314 | 2/1967 | Freeland et al. | 423/584 |
| 4,056,605 | 11/1977 | Vulikh et al. | |
| 4,792,403 | 12/1988 | Togo et al. | |
| 4,999,179 | 3/1991 | Sugihara et al. | |
| 5,614,165 | 3/1997 | Sugihara et al. | 423/584 |

FOREIGN PATENT DOCUMENTS 1 792 177   11/1971   Germany.

*Primary Examiner*—Wayne Langel
*Attorney, Agent, or Firm*—Frishauf, Holtz, Goodman, Langer & Chick, P.C.

[57] ABSTRACT

A process for producing a purified aqueous hydrogen peroxide solution comprising bringing an aqueous hydrogen peroxide solution containing impurities into contact with an anion exchange resin in the fluoride form is disclosed.

According to the process, impurities in the aqueous hydrogen peroxide solution, particularly impurities containing silicon, such as silicates and silicic acid, can efficiently be removed, and a purified aqueous hydrogen peroxide solution having a high purity can be obtained.

9 Claims, No Drawings

5,733,521

PROCESS FOR PRODUCING A PURIFIED AQUEOUS HYDROGEN PEROXIDE SOLUTION

BACKGROUND OF THE INVENTION

1. Field of the Invention

The present invention relates to a process for producing a purified aqueous hydrogen peroxide solution. More particularly, the present invention relates to a process for producing an aqueous hydrogen peroxide solution having a high purity by removing silicon components which are contained in an aqueous hydrogen peroxide solution.

2. Description of the Related Arts

Hydrogen peroxide is widely used in many fields, for example, for bleaching paper and pulp and as a component in chemical polishing fluids. In recent years, hydrogen peroxide has increasingly been used in the electronic industry, for example, as a cleaning agent for silicon wafers and as a cleaning agent in production processes of semiconductors. In this field, higher purity of used materials is required because of increase in the degree of integration. It is required for hydrogen peroxide that a very high purity be achieved by extremely decreasing the contents of all impurities including silicon components as well as metal components such as Al, Fe, and Cr.

Hydrogen peroxide is produced almost exclusively by the anthraquinone process at present. The anthraquinone process is generally conducted as follows. A derivative of anthraquinone, such as a 2-alkylanthraquinone, is converted into the corresponding anthrahydroquinone by hydrogenation in a water-insoluble organic solvent in the presence of a hydrogenation catalyst. After the catalyst is removed by filtration, the reaction product is oxidized with the air to regenerate the original 2-alkylanthraquinone, and hydrogen peroxide is produced at the same time. By extracting the produced hydrogen peroxide from the oxidation product with water, an aqueous solution containing hydrogen peroxide can be obtained. The aqueous hydrogen peroxide solution obtained after the extraction with water contains considerable mounts of impurities formed in the oxidation step, such as silicon components from the air such as silicic acid and silicates, organic impurities such as the anthraquinone, the solvent, and degradation products from these substances, and metal components such as Al, Fe, and Cr derived from materials constituting apparatus of various steps. The aqueous hydrogen peroxide solution is subject to a treatment for purification which provides the required quality.

As the process for purification of hydrogen peroxide, the distillation process, the filtration process using a membrane, the adsorption process using a resin, and the ion exchange resin process are used singly or as a combination of two or more processes.

Organic impurities are mainly removed by the distillation process or the adsorption process using a resin. Cations of metals and anions content are removed by the ion exchange resin process. Insoluble impurities having a specific diameter or larger are removed by the filtration process using a membrane.

However, no proposal for technology of removing silicon components, such as silicates (for example, potassium silicate, sodium silicate, and aluminum silicate) and silicic acid, can heretofore been found among conventional technologies for purification of an aqueous hydrogen peroxide solution.

For example, the distillation process, including the step of increasing the concentration of hydrogen peroxide by removing water, is effective as a purification process of hydrogen peroxide because organic impurities, particularly compounds used in the auto-oxidation process, are effectively removed by the process, and has widely been practiced. In this process, a purified concentrated solution can be obtained by vaporizing a crude aqueous hydrogen peroxide solution, separating the formed vapor from the fluid, and supplying the separated vapor to a fractionator to achieve the concentration. However, this process has a problem that inorganic ions such as metal ions and other non-volatile matters which are derived from the materials of the apparatus and from the crude aqueous hydrogen peroxide solution used for the distillation remain in the purified concentrated product.

As a method for solving the problem in the distillation process which is caused by the crude aqueous hydrogen peroxide solution, for example, a process is proposed in Japanese Patent Application Laid-Open Heisei 7(1995)-80227. The problem that the purity of the purified concentrated solution is decreased can be solved by this process in which a multi-stage cyclone constituted with 2 or 3 individual cyclones connected in series is used as the cyclone for the gas-liquid separation. However, the product of this process contains impurities derived from packings and materials of the concentration tower. Particularly, because interlocked saddles and Raschig rings which are used as the packings are made of ceramics containing silicon components, such as silicon, potassium, and sodium, the silicon components are dissolved into the aqueous hydrogen peroxide solution. Impurities derived from aluminum metal and aluminum alloys which constitute the concentration tower are also contained in the aqueous hydrogen peroxide solution.

In the field of the semiconductor industry, ultra-pure water obtained by extreme purification of water is used along with the aqueous hydrogen peroxide solution. A high purity is required also for the ultra-pure water. As the technology for purification of water, systems constituted with a combination of a plurality of apparatus, such as an RO (reverse osmolysis membrane) apparatus, a cation exchange resin tower, a decarbonation tower, an anion exchange resin tower, a Mix bed (a mixed bed resin), a UV (ultraviolet light) irradiation apparatus, and an ultra-filtration apparatus, are widely adopted.

For example, when a system in which an RO apparatus, an anion exchange resin tower, and a Mix bed are arranged in this order is used, the concentration of silica at the outlet of the RO apparatus can be reduced to micrograms per liter. The concentration of silica is further reduced to 0.5 µg/liter or less by the additional treatments with the anion exchange resin and the Mix bed. Thus, it is known that ultra-pure water having a very low concentration of silica and also very low concentrations of other impurities can be produced by this process. It is also known that the silica component can be removed by using, as the anion exchange resin, a strongly basic anion exchange resin in the hydroxide form having a quaternary ammonium group.

Japanese Patent Application Laid-Open Heisei 7(1995)-109109 discloses a process for purification of an aqueous hydrogen peroxide solution by using a system constituted with a reverse osmolysis membrane apparatus, an anion exchange apparatus, and a cation exchange apparatus.

This process is an application of the system for production of ultra-pure water described above to the purification of an aqueous hydrogen peroxide solution. However, the system for production of ultra-pure water causes some problems when it is applied to the purification of an aqueous hydrogen peroxide solution. The reverse osmolysis membrane apparatus is operated under a high pressure of 5 to 30 kg/cm$^2$. A polyamide membrane used as the material of the apparatus is gradually degraded by oxidation because of chemical attack by hydrogen peroxide. Therefore, stable operation of the system for a long time is not assured. Moreover, the reverse osmolysis apparatus must be operated while an aqueous hydrogen peroxide solution containing impurities in higher concentrations is continuously discharged. This requirement causes decrease in the yield of the purified aqueous hydrogen peroxide solution.

An example of the technology for the purification of an aqueous hydrogen peroxide solution by using an ion exchange resin is described in Japanese Patent Publication Showa 28(1953)-3816. In this technology, an aqueous hydrogen peroxide solution is brought into contact with a sulfonated aromatic hydrocarbon type cation exchange resin to remove mainly metal cations.

In Japanese Patent Publication Showa 35(1960)-16677 and in the U.S. Pat. No. 3,297,404, processes for removing anionic impurities in an aqueous hydrogen peroxide solution by using an anion exchange resin having a quaternary ammonium group are described. It is also described that the quaternary ammonium group is used in the form of carbonate or bicarbonate. The use of a resin having a carbonate form or a bicarbonate form which has a lower basicity was proposed because hydrogen peroxide is very rapidly decomposed by an anion exchange resin in the hydroxide form.

In the U.S. Pat. No. 4,999,179, a process for obtaining a purified aqueous hydrogen peroxide solution by passing an aqueous hydrogen peroxide solutions continuously through a layer of a cation exchange resin having sulfonic acid group, a layer of an adsorbing resin containing a halogen, and a layer of anion exchange resin having a quaternary ammonium group is described. In this process, the anion exchange resin is used in a carbonate form or a bicarbonate form. It can be understood from these descriptions that rigorous safety control and management for safety are required when an anion exchange resin in the hydroxide form is used for purification of hydrogen peroxide, and this situation causes a big problem in a commercial plant. Moreover, silicon components in an aqueous hydrogen peroxide solution cannot be removed even when an anion exchange resin in the hydroxide form is used.

In the above conventional processes, it is not possible that silicon components in the aqueous hydrogen peroxide solution, such as silicates (for example, potassium silicate, sodium silicate, and aluminum silicate) and silicic acid, are removed and a purified aqueous hydrogen peroxide solution having a very high purity and substantially no silicon content are obtained.

SUMMARY OF THE INVENTION

The present invention has an object to solve the problems in the conventional technologies and to provide a process for producing a purified aqueous hydrogen peroxide solution having a high purity by removing impurities containing silicon, such as silicates and silicic acid, which are contained in an aqueous hydrogen peroxide solution.

The present inventors conducted extensive studies to develop a process for producing a purified aqueous hydrogen peroxide solution having a high purity by removing silicon components, such as silicates and silicic acid, from an aqueous hydrogen peroxide solution. As the result of the studies, it was discovered that, when an aqueous hydrogen peroxide solution containing impurities was brought into contact with an anion exchange resin in the fluoride form, the silicon components were removed, and a purified aqueous hydrogen peroxide solution was obtained. It was also discovered that, when the above aqueous hydrogen peroxide solution containing impurities was brought into contact with the anion exchange resin in the fluoride form in combination with an ion exchange resin which was a combination of a strongly cation exchange resin having sulfonic acid group and an anion exchange resin in the bicarbonate form, a purified aqueous hydrogen peroxide solution having a still higher purity could be produced. The present invention has been completed on the basis of these discoveries.

Accordingly, the present invention provides a process for producing a purified aqueous hydrogen peroxide solution comprising bringing an aqueous hydrogen peroxide solution containing impurities into contact with an anion exchange resin in the fluoride form.

DESCRIPTION OF THE PREFERRED EMBODIMENTS

As the anion exchange resin used in the present invention, a resin obtained by converting a basic anion exchange resin in the fluoride form is used. Examples of the basic anion exchange resin which can generally be used in the present invention include strongly basic anion exchange resins obtained by chloromethylation of a styrene-divinylbenzene crosslinked copolymer, followed by amination of the product by trimethylamine or dimethylethanolamine and subsequently by forming a quaternery salt of the product of amination; weak basic anion exchange resins derived from the same styrene-divinylbenzene crosslinked copolymer as that described above and having a primary, secondary, or tertiary amine as the ion exchange group; resins derived from an acrylic crosslinked polymer and having a tertiary amine as the exchange group; and pyridine type anion exchange resins comprising a polymer having pyridyl group or a substituted pyridyl group. Among these resins, strongly basic anion exchange resins having a quaternary ammonium group, such as trimethylammonium group and dimethylethanolammonium group, as the ion exchange group are preferable. Many types of strongly basic anion exchange resins having a quaternary ammonium group are commercially available.

Typical examples of the commercially available anion exchange resin having a quaternary ammonium group include products of DIAION PA series (such as PA316 and PA318) and DIAION SA series (such as SA10A) produced by MITSUBISHI CHEMICAL CORPORATION, Ltd. and products of Amberlite IRA series (such as IRA-900 and IRA-904) produced by ORGANO Co., Ltd. These resins are generally available as resins in the chloride form.

In the present invention, as the basic anion exchange resin used for obtaining a resin in the fluoride form, a commercially available resin in the chloride form may be used directly. Resins in the hydroxide form, the bicarbonate form, and the carbonate form which are used in conventional technologies for purification of an aqueous hydrogen peroxide solution may also be used. Resins in other forms may be used as well without any problem.

In the present invention, a basic anion exchange resin can be converted into the corresponding resin in the fluoride form by bringing the basic anion exchange resin into contact with an aqueous solution containing fluoride ion. The method of bringing the basic anion exchange resin into contact with the aqueous solution containing fluoride ion is not particularly limited, and any of a batch process and a continuous flow process can be used. The process in which, after a basic anion exchange resin is packed into a column, an aqueous solution containing fluoride ion is passed through the column and then the resin in the column is thoroughly washed with ultra-pure water is effective and preferable as the industrial process. The condition of the continuous flow of the aqueous solution containing fluoride ion is not particularly limited and can be adjusted to a conventional condition which is generally used in adjustment of the salt form of an ion exchange resin.

The fluoride compound used for preparation of the aqueous solution containing fluoride ion is not particularly limited as long as the fluoride compound is dissociated to form fluoride ion in the aqueous solution. Compounds easily soluble in water, such as hydrofluoric acid, sodium fluoride, hydrogen sodium fluoride, potassium fluoride, hydrogen potassium fluoride, ammonium fluoride, and hydrogen ammonium fluoride, are preferable because the amount of the solution required for conversion of a basic anion exchange resin in the fluoride form can be held small.

The aqueous hydrogen peroxide solution containing impurities which is treated by the process of the present invention can be prepared by any of the desired processes including the anthraquinone process and the direct synthesis in which hydrogen and oxygen are directly brought into the reaction. As described above, hydrogen peroxide is currently produced almost exclusively by the anthraquinone process. The aqueous hydrogen peroxide solution obtained by the anthraquinone process is treated by a purification process which is selected in accordance with requirements. The aqueous hydrogen peroxide solution obtained after the purification contains impurities, such as silicon components, organic substances, and metals, and additional purification is necessary.

In the present invention, any of a continuous flow process and a batch process may be used as the process for bringing the aqueous hydrogen peroxide solution containing impurities into contact with the anion exchange resin in the fluoride form. In a continuous flow process, for example, the aqueous hydrogen peroxide solution containing impurities is continuously supplied to pass through the anion exchange resin in the fluoride form which is packed into a column. In a batch process, for example, the anion exchange resin in the fluoride form and the aqueous hydrogen peroxide solution containing impurities are mixed together for a prescribed time while being stirred, then the resin is separated, and the purified hydrogen peroxide is taken out. For industrial production, the continuous flow process using a column packed with the resin is preferable because it is necessary that the salt form is adjusted and the resin is regenerated when the adsorption ability of the resin decreased. In the continuous flow process, it is preferred that the aqueous hydrogen peroxide solution is passed through the resin layer in the column at a linear velocity (LV) in the range of 1 to 500 m/Hr and a space velocity (SV) in the range of 1 to 300/Hr.

The temperature of bringing the anion exchange resin in the fluoride form and the aqueous hydrogen fluoride solution into contact with each other is described in the following. In a conventional technology using an anion exchange resin in the hydroxide form, the bicarbonate form, or the carbonate form, a temperature of 30° C. or lower is preferred, and a lowest possible temperature is used. This temperature is regulated in order to prevent degradation of the resin by oxidation with hydrogen peroxide and to solve the problems on safety by suppressing generation of gases and heat caused by decomposition of hydrogen peroxide during the contact between the resin and the aqueous solution. In the process of the present invention using the resin having a fluoride form, a temperature in the range of 30° C. or lower is also preferable, and a temperature in the range of −10° to 20° C. is more preferable, as the temperature of bringing the resin and the aqueous solution into contact with each other in order to prevent degradation of the resin by oxidation. However, a method to prevent the problem caused by the gases generated by the decomposition of hydrogen peroxide and to assure the safety is hardly required because the amount of gases generated by decomposition of hydrogen peroxide in the presence of the resin in the fluoride form is as small as 1/10 of that in the presence of the resin in the bicarbonate form and as small as 1/300 of that in the presence of the resin in the hydroxide form.

In the process of the present invention, it is also effective that an acid having an acid dissociation constant pKa of 5 or less in water is added to the aqueous hydrogen peroxide solution containing impurities, and the resultant solution is brought into contact with the anion exchange resin in the fluoride form described above. By adding the acid, the silicon components which are most difficult to be removed from the aqueous hydrogen peroxide solution can more easily be removed.

The acid added to the aqueous hydrogen peroxide solution is an acid having an acid dissociation constant pKa of 5 or less in water at 25° C. Examples of the acid include inorganic acids, such as hydrochloric acid, sulfuric acid, nitric acid, phosphoric acid, hydrofluoric acid, chlorous acid, phosphinic acid, phosphonic acid, diphosphoric acid, and tripolyphosphoric acid, and organic acids, such as formic acid, acetic acid, chloroacetic acid, fluoroacetic acid, oxalic acid, benzoic acid, organic phosphonic acids, and organic sulfonic acids. Among these acids, inorganic acids, such as hydrochloric acid, nitric acid, phosphoric acid, and sulfuric acid, are preferable.

The amount of the acid added to the aqueous hydrogen peroxide solution is not particularly limited. It is preferred that the amount is generally adjusted in the range of 0.005 to 5 meq/liter. When the amount is less than 0.005 meq/liter, there is the possibility that the fraction of the removed silicon impurities is decreased, and the amount is not advantageous for the efficiency. When the amount is more than 5 meq/liter, a problem occasionally arises in that the process for purification is required to have additional capability for removing the added acid, and the amount is not preferable.

As described above, the process of the present invention can be conducted by bringing the aqueous hydrogen peroxide solution containing impurities into contact with the anion exchange resin in the fluoride form. It is also possible to obtain a purified aqueous hydrogen peroxide solution having a still higher purity when the aqueous hydrogen peroxide solution containing impurities is brought into contact with a strongly cation exchange resin having a sulfonic acid group and an anion exchange resin in the bicarbonate form in combination with the anion exchange resin in the fluoride form. When this process is used, the order of the columns through which the aqueous hydrogen peroxide solution containing impurities is passed (the order of the ion exchange resins with which the aqueous solution is brought into contact) can be selected as desired and not particularly limited. For example, the aqueous hydrogen peroxide solution may be passed through (1) the column packed with the strongly acidic cation exchange resin having a sulfonic acid group, the column pack with the anion exchange resin in the fluoride form, and the column pack with the anion exchange resin in the bicarbonate form, in this order, or (2) the column packed with the anion exchange resin in the fluoride form, the column packed with the strongly acidic cation exchange resin having a sulfonic acid group, and the column packed with the anion exchange resin in the bicarbonate form, in this order. A method suitable for the components contained in the aqueous hydrogen peroxide solution containing impurities can be adopted. In another way, an ion exchange resin in which the strongly acidic cation exchange resin having a sulfonic acid group and the anion exchange resin in the bicarbonate form are mixed together may be used in combination with the anion exchange resin in the fluoride form. The order of contact can be selected as desired also in this case. It is preferred that, after the aqueous hydrogen peroxide solution containing impurities is brought into contact with the anion exchange resin having a fluoride form, the aqueous solution is brought into contact with the ion exchange resin in which the strongly acidic cation exchange resin having a sulfonic acid group and the anion exchange resin in the bicarbonate form are mixed together.

As described above, a purified aqueous hydrogen peroxide solution having a high purity from which silicons, metals, and anions have been removed can be produced by using the anion exchange resin in the fluoride form in combination with conventional ion exchange resins.

In the present invention, a very specific phenomenon can be found in that the silicon components are more effectively removed at higher concentrations of hydrogen peroxide in the aqueous hydrogen peroxide solution which is brought into contact with the anion exchange resin in the fluoride form. In other words, the effect of the resin to remove the silicon components is significantly exhibited when the concentration of hydrogen peroxide is 15% by weight or more while the effect is considerably decreased when the concentration is 10% by weight or less. Therefore, it is effective that an aqueous hydrogen peroxide solution having a concentration of hydrogen peroxide of 15% by weight or more, particularly 15 to 40% by weight, is used. On the other hand, an aqueous hydrogen peroxide solution having a concentration of hydrogen peroxide of 20 to 40% by weight is widely used in processes for producing semiconductors. Therefore, an aqueous hydrogen peroxide solution having a concentration of hydrogen peroxide in the range of 20 to 40% by weight is preferable because an additional adjustment in the concentration is not necessary. However, the concentration of hydrogen peroxide is not limited to this range, and a concentration of more than 40% by weight may be used. When a concentration of more than 40% by weight is used, it is preferred that the temperature is kept low when the degradation of the resin by oxidation and the safety which have been described above are considered.

According to the process of the present invention, silicon components, such as silicates and silicic acid, can be removed from an aqueous hydrogen peroxide solution by bringing the aqueous solution into contact with the anion exchange resin in the fluoride form described above, and a purified aqueous hydrogen peroxide solution having a high purity can be obtained.

The present invention is described more specifically with reference to examples. However, the present invention is not limited to the examples.

In the present invention, the measurements of the contents of impurities in a aqueous hydrogen peroxide solution were conducted in accordance with the following methods. The contents of cationic impurities, silicon (Si), and potassium (K) were measured by using a flameless atomic absorption spectroscopy (a product of VARIAN Co., Ltd.; AA400Z). When the content of silicon was measured, a calcium (Ca) modifier was used to enhance the sensitivity.

The contents of cations (except for silicon) in small amounts were measured by the ICP-MS (inductive coupling mass spectrometry) using an apparatus PMS-2000 (a product of YOKOGAWA ANALYTICAL SYSTEMS Co., Ltd.).

EXAMPLE 1

A strongly basic anion exchange resin PA318 in the chloride form (quaternary ammonium I type) produced by MITSUBISHI CHEMICAL CORPORATION, Ltd. was packed into a column made of Teflon. After a 2N aqueous solution of sodium hydroxide was passed through the prepared column at an SV of 20 $Hr^{-1}$ for 5 hours, ultra-pure water was passed through the column for washing at an SV of 20 $Hr^{-1}$ for 10 hours to prepare an anion exchange resin in the hydroxide form. Then, after an aqueous solution of hydrofluoric acid in a concentration of 2 mol/liter (2M) was passed through the column at an SV of 20 $Hr^{-1}$ for 5 hours, ultra-pure water was passed through the column for washing at an SV of 20 $Hr^{-1}$ for 10 hours to prepare an anion exchange resin in the fluoride form.

A crude 31% aqueous hydrogen peroxide solution containing 26 ppb of Si, 180 ppb of K, and 0.1 ppb or less each of Na, Al, Fe and other metals was passed through an ion exchange resin tower which is a column having an inside diameter of 10 mm, made of Teflon, and packed with 10 ml of the above-prepared anion exchange resin in the fluoride form at a temperature of 1° C. at an SV of 20 $Hr^{-1}$ for 1.5 hours.

A sample was taken from the solution coming out at the outlet of the column 0.5 hour after the start of the flow of the solution. Si and metals contained in the sample hydrogen peroxide solution after the flow through the column were analyzed. The sample solution contained 1 ppb or less of Si, 180 ppb of K, and 0.1 ppb or less of other metals. Thus, the obtained solution was found to be an aqueous hydrogen peroxide solution containing a reduced amount of Si.

EXAMPLE 2

The same procedures were conducted as those conducted in Example 1 except that a crude aqueous hydrogen peroxide solution containing 20% of hydrogen peroxide, 21 ppb of Si, 180 ppb of K, and 0.1 ppb or less each of Na, Al, Fe, and other metals was used.

The aqueous hydrogen peroxide solution obtained after the flow through the column contained 5 ppb of Si, 180 ppb of K, and 0.1 ppb or less each of other metals. Thus, the obtained solution was found to be an aqueous hydrogen peroxide solution containing a reduced amount of Si.

EXAMPLE 3

The same procedures were conducted as those conducted in Example 1 except that a crude aqueous hydrogen peroxide solution containing 15% of hydrogen peroxide, 21 ppb of Si, 180 ppb of K, and 0.1 ppb or less each of Na, Al, Fe, and other metals was used.

The aqueous hydrogen peroxide solution obtained after the flow through the column contained 16 ppb of Si, 180 ppb of K, and 0.1 ppb or less each of other metals. Thus, the obtained solution was found to be an aqueous hydrogen peroxide solution containing a reduced amount of Si.

EXAMPLE 4

The same procedures were conducted as those conducted in Example 1 except that a crude aqueous hydrogen peroxide solution containing 31% of hydrogen peroxide, 43 ppb of Si and 0.1 ppb or less each of K, Na, Al, Fe, and other metals was used.

The aqueous hydrogen peroxide solution obtained after the flow through the column contained 8 ppb of Si and 0.1 ppb or less each of other metals. Thus, the obtained solution was found to be an aqueous hydrogen peroxide solution of a high purity containing a reduced amount of Si.

EXAMPLE 5

The same procedures were conducted as those conducted in Example 1 except that a crude aqueous hydrogen peroxide solution containing 31% of hydrogen peroxide, 28 ppb of Si, 0.3 ppb of Al, 8 ppb of Na, and 0.1 ppb or less each of K, Fe, and other metals was used.

The aqueous hydrogen peroxide solution obtained after the flow through the column contained 1 ppb or less of Si, 0.3 ppb of Al, 8 ppb of Na, and 0.1 ppb or less each of other metals. Thus, the obtained solution was found to be an aqueous hydrogen peroxide solution containing a reduced amount of Si.

EXAMPLE 6

A strongly basic anion exchange resin PA318 in the chloride form (quaternary ammonium I type) produced by MITSUBISHI CHEMICAL CORPORATION, Ltd. was packed into a column made of Teflon. After a 5% aqueous solution of sodium bicarbonate was passed through the prepared column at an SV of 20 $Hr^{-1}$ for 5 hours, ultra-pure water was passed through the column for washing at an SV of 20 $Hr^{-1}$ for 10 hours to prepare an anion exchange resin in the bicarbonate form. Then, after a 2M aqueous solution of hydrofluoric acid was passed through the column at an SV of 20 $Hr^{-1}$ for 5 hours, ultra-pure water was passed through the column for washing at an SV of 20 $Hr^{-1}$ for 10 hours to prepare an anion exchange resin in the fluoride form.

A crude aqueous hydrogen peroxide solution containing 31% of hydrogen peroxide, 26 ppb of Si, 180 ppb of K, and 0.1 ppb or less each of Na, Al, Fe, and other metals was treated with the above-prepared anion exchange resin in the fluoride form in accordance with the same procedures as those conducted in Example 1.

The obtained solution contained 4 ppb of Si, 180 ppb of K, and 0.1 ppb or less of other metals. Thus, the solution was found to be an aqueous hydrogen peroxide solution containing a reduced amount of Si.

EXAMPLE 7

A strongly basic anion exchange resin PA318 in the chloride form (quaternary ammonium I type) produced by MITSUBISHI CHEMICAL CORPORATION, Ltd. was packed into a column made of Teflon. After a 5% aqueous solution of sodium bicarbonate was passed through the prepared column at an SV of 20 $Hr^{-1}$ for 5 hours, ultra-pure water was passed through the column for washing at an SV of 20 $Hr^{-1}$ for 10 hours to prepare an anion exchange resin in the bicarbonate form. Then, after a 1M aqueous solution of sodium fluoride was passed through the column at an SV of 40 $Hr^{-1}$ for 5 hours, ultra-pure water was passed through the column for washing at an SV of 20 $Hr^{-1}$ for 10 hours to prepare an anion exchange resin in the fluoride form.

An aqueous hydrogen peroxide solution containing 31% of hydrogen peroxide, 25 ppb of Si, 180 ppb of K, and 0.1 ppb or less each of Na, Al, Fe, and other metals was treated with the above-prepared anion exchange resin in the fluoride form in accordance with the same procedures as those conducted in Example 1.

The obtained solution contained 4 ppb of Si, 180 ppb of K, and 0.1 ppb or less of other metals. Thus, the solution was found to be an aqueous hydrogen peroxide solution containing a reduced amount of Si.

EXAMPLE 8

A strongly basic anion exchange resin PA318 in the chloride form (quaternary ammonium I type) produced by MITSUBISHI CHEMICAL CORPORATION, Ltd. was packed into a column made of Teflon. After a 5% aqueous solution of sodium bicarbonate was passed through the column at an SV of 20 $Hr^{-1}$ for 5 hours, ultra-pure water was passed through the column for washing at an SV of 20 $Hr^{-1}$ for 10 hours to prepare an anion exchange resin in the bicarbonate form. Then, after a 0.5M aqueous solution of hydrogen sodium fluoride was passed through the column at an SV of 80 $Hr^{-1}$ for 5 hours, ultra-pure water was passed through the column for washing at an SV of 20 $Hr^{-1}$ for 10 hours to prepare an anion exchange resin in the fluoride form.

An aqueous hydrogen peroxide solution containing 31% of hydrogen peroxide, 27 ppb of Si, 180 ppb of K, and 0.1 ppb or less each of Na, Al, Fe, and other metals was treated with the above-prepared anion exchange resin in the fluoride form in accordance with the same procedures as those conducted in Example 1.

The obtained solution contained 2 ppb of Si, 180 ppb of K, and 0.1 ppb or less of other metals. Thus, the solution was found to be an aqueous hydrogen peroxide solution containing a reduced amount of Si.

EXAMPLE 9

A strongly basic anion exchange resin PA318 in the chloride form (quaternary ammonium I type) produced by MITSUBISHI CHEMICAL CORPORATION, Ltd. was packed into a column made of Teflon. After a 5% aqueous solution of sodium bicarbonate was passed through the column at an SV of 20 $Hr^{-1}$ for 5 hours, ultra-pure water was passed through the column for washing at an SV of 20 $Hr^{-1}$ for 10 hours to prepare an anion exchange resin in the bicarbonate form. Then, after a 2M aqueous solution of hydrofluoric acid was passed through the column at an SV of 20 $Hr^{-1}$ for 5 hours, ultra-pure water was passed through the column for washing at an SV of 20 $Hr^{-1}$ for 10 hours to prepare an anion exchange resin in the fluoride form.

The above-prepared anion exchange resin in the fluoride form in an amount of 10 ml was packed into a column having an inside diameter of 10 mm and made of Teflon to prepare the first ion exchange tower. A column having an inside diameter of 10 mm and made of Teflon was packed with 10 ml of a mixed resin prepared by mixing a strongly acidic cation exchange resin having a sulfonic acid group (a product of MITSUBISHI CHEMICAL CORPORATION, Ltd.; DIAION PK228LH) and an anion exchange ion in the bicarbonate form in relative volumes of 1:1 to prepare the second ion exchange tower. The second ion exchange tower was connected to the down flow of the first ion exchange tower prepared above.

A crude 31% aqueous hydrogen peroxide solution containing 28 ppb of Si, 0.3 ppb of Al, 8 ppb of Na, and 0.1 ppb or less each of K, Fe, and other metals was passed through the first and second ion exchange towers at a temperature of 1° C. at an SV of 20 $Hr^{-1}$ for 1.5 hours.

A sample was taken from the solution coming out at the outlet of the column 0.5 hour after the start of the flow of the solution. Si and metals contained in the sample of hydrogen peroxide solution after the flow through the column were analyzed. The sample solution contained 1 ppb or less of Si and 0.1 ppb or less oral, Na, and other metals. Thus, the obtained solution was found to be a highly purified aqueous hydrogen peroxide solution.

COMPARATIVE EXAMPLE 1

A strongly basic anion exchange resin PA318 in the chloride form (quaternary ammonium I type) produced by MITSUBISHI CHEMICAL CORPORATION, Ltd. was packed into a column made of Teflon, and ultra-pure water was passed through the prepared column for washing at an SV of 20 $Hr^{-1}$ for 10 hours.

An aqueous hydrogen peroxide solution containing 31% of hydrogen peroxide, 26 ppb of Si, 180 ppb of K, and 0.1 ppb or less each of Na, Al, Fe, and other metals was treated with the above strongly basic anion exchange resin PA318 in the chloride form in accordance with the same procedures as those conducted in Example 1.

The obtained solution contained 27 ppb of Si, 180 ppb of K, and 0.1 ppb or less of other metals. Thus, the content of Si in the solution was not reduced.

COMPARATIVE EXAMPLE 2

A strongly basic anion exchange resin PA318 in the chloride form (quaternary ammonium I type) produced by MITSUBISHI CHEMICAL CORPORATION, Ltd. was packed into a column made of Teflon. After a 5% aqueous solution of sodium bicarbonate was passed through the column at an SV of 20 $Hr^{-1}$ for 5 hours, ultra-pure water was passed through the column for washing at an SV of 20 $Hr^{-1}$ for 10 hours to prepare an anion exchange resin in the bicarbonate form.

An aqueous hydrogen peroxide solution containing 31% of hydrogen peroxide, 13 ppb of Si, 180 ppb of K, and 0.1 ppb or less each of Na, Al, Fe, and other metals was treated with the above anion exchange resin in the bicarbonate form in accordance with the same procedures as those conducted in Example 1.

The obtained solution contained 13 ppb of Si, 180 ppb of K, and 0.1 ppb or less of other metals. Thus, the content of Si in the solution was not reduced.

COMPARATIVE EXAMPLE 3

A strongly basic anion exchange resin PA318 in the chloride form (quaternary ammonium I type) produced by MITSUBISHI CHEMICAL CORPORATION, Ltd. was packed into a column made of Teflon. After an aqueous sodium hydroxide solution was passed through the column at an SV of 20 $Hr^{-1}$ for 5 hours, ultra-pure water was passed through the column for washing at an SV of 20 $Hr^{-1}$ for 10 hours to prepare an anion exchange resin in the hydroxide form.

An aqueous hydrogen peroxide solution containing 31% of hydrogen peroxide, 20 ppb of Si, 180 ppb of K, and 0.1 ppb or less each of Na, Al, Fe, and other metals was treated with the above anion exchange resin in the hydroxide form in accordance with the same procedures as those conducted in Example 1.

The obtained solution contained 20 ppb of Si, 180 ppb of K, and 0.1 ppb or less of other metals. Thus, the content of Si in the solution was not reduced.

EXAMPLE 10

A strongly basic anion exchange resin PA318 in the chloride form (quaternary ammonium I type) produced by MITSUBISHI CHEMICAL CORPORATION, Ltd. was packed into a column made of Teflon. After a 2N (normal) aqueous solution of sodium hydroxide was passed through the column at an SV of 20 $Hr^{-1}$ for 5 hours, ultra-pure water was passed through the column for washing at an SV of 20 $Hr^{-1}$ for 10 hours to prepare an anion exchange resin in the hydroxide form. Then, after a 1M aqueous solution of sodium fluoride was passed through the column at an SV of 20 $Hr^{-1}$ for 5 hours, ultra-pure water was passed through the column for washing at an SV of 20 $Hr^{-1}$ for 10 hours to prepare an anion exchange resin in the fluoride form. The prepared anion exchange resin in the fluoride form in an amount of 12.5 ml was packed into a column made of Teflon and having an inside diameter of 10 mm.

A strongly acidic cation exchange resin PK228 (H-type) produced by MITSUBISHI CHEMICAL CORPORATION, Ltd. in an amount of 5 ml was mixed with 5 ml of a resin in the bicarbonate form which was prepared by converting a strongly basic anion exchange resin PA318 in the chloride form (quaternary ammonium I type) produced by MITSUBISHI CHEMICAL CORPORATION, Ltd. under a prescribed condition. The prepared fixed resin was packed into a column made of Teflon and having an inside diameter of 10 mm. The packed column was connected in series to the down flow of the column prepared above.

The combined columns were washed with ultra-pure water at a speed of 500 ml/Hr for 1 hour. To a crude 31% aqueous hydrogen peroxide solution containing 3.9 ppb of Si, 70 ppb of Al, and 1 ppb or less each of Na, Fe, and other metals, hydrochloric acid was added in such an amount that the concentrations of hydrochloric acid in the resultant solution was adjusted to 0.07, 0.12, 0.25, or 1.2 meq/liter. Thus, four aqueous hydrogen peroxide solutions containing the different amounts of hydrochloric acid were prepared. The prepared solutions were passed through the combined columns prepared above at a temperature of 1° C. at a speed of 500 ml/Hr for 1.5 hours.

A sample was taken from each aqueous hydrogen peroxide solution at the outlet of the second column 0.5 hour after the start of the flow of the solution. Si and metals contained in the sample hydrogen peroxide solutions after the flow through the columns were analyzed. The contents of Si in the solutions after the flow through the columns are shown in Table 1. The solutions contained 0.1 ppb or less each of metals other than Si and 3 ppb or less of chlorine ion. Thus, the obtained solutions were found to be aqueous hydrogen peroxide solutions containing a reduced amount of Si.

TABLE 1

| amount of added HCl (meq/liter) | Si in the aq. soln. of $H_2O_2$ after flow through columns (ppb) | fraction of removed Si (%) |
| --- | --- | --- |
| 0.07 | 0.9 | 76.9 |
| 0.12 | 0.6 | 84.6 |
| 0.25 | 0.4 | 89.7 |
| 1.20 | 0.3 | 92.3 |

EXAMPLE 11

The same procedures as those conducted in Example 10 were conducted except that a crude 31% aqueous hydrogen peroxide solution containing 3.9 ppb of Si, 70 ppb of Al, and 1 ppb or less each of Na, Fe, and other metals was used, and nitric acid was added in place of hydrochloric acid in such amounts that the concentrations of nitric acid were adjusted to 0.04, 0.07, 0.14, and 0.71 meq/liter.

A sample was taken from each aqueous hydrogen peroxide solution at the outlet of the second column 0.5 hour after the start of the flow of the solution. Si and metals contained in the sample solutions of hydrogen peroxide after the flow through the columns were analyzed. The contents of Si in the solutions after the flow through the columns are shown in Table 2. The solutions contained 0.1 ppb or less each of metals other than Si, 180 ppb of K, and 3 ppb or less of $NO_3$ ion. Thus, the obtained solutions were found to be aqueous hydrogen peroxide solutions containing a reduced amount of Si.

TABLE 2

| amount of added $HNO_3$ (meq/liter) | Si in the aq. soln. of $H_2O_2$ after flow through columns (ppb) | fraction of removed Si (%) |
|---|---|---|
| 0.04 | 1.3 | 66.7 |
| 0.07 | 0.8 | 79.5 |
| 0.14 | 0.5 | 87.2 |
| 0.71 | 0.4 | 89.7 |

EXAMPLE 12

The same procedures as those conducted in Example 10 were conducted except that a crude 31% aqueous hydrogen peroxide solution containing 3.9 ppb of Si, 70 ppb of Al, and 1 ppb or less each of Na, Fe, and other metals was used, and phosphoric acid was added in place of hydrochloric acid in such amounts that the concentrations of phosphoric acid were adjusted to 0.07, 0.12, 0.23, and 0.98 meq/liter.

A sample was taken from each aqueous hydrogen peroxide solution at the outlet of the second column 0.5 hour after the start of the flow of the solution. Si and metals contained in the sample solutions of hydrogen peroxide after the flow through the columns were analyzed. The contents of Si in the solutions after the flow through the columns are shown in Table 3. The solutions contained 0.1 ppb or less each of metals other than Si and 3 ppb or less of $PO_4$ ion. Thus, the obtained solutions were found to be aqueous solutions of hydrogen peroxide containing a reduced amount of Si.

TABLE 3

| amount of added $H_3PO_4$ (meq/liter) | Si in the aq. soln. of $H_2O_2$ after flow through columns (ppb) | fraction of removed Si (%) |
|---|---|---|
| 0.07 | 1.0 | 74.4 |
| 0.12 | 1.0 | 74.4 |
| 0.23 | 0.6 | 84.6 |
| 0.98 | 0.4 | 89.7 |

EXAMPLE 13

The same procedures as those conducted in Example 10 were conducted except that a 31% crude aqueous hydrogen peroxide solution containing 3.9 ppb of Si, 70 ppb oral, and 1 ppb or less each of Na, Fe, and other metals was used, and sulfuric acid was added in place of hydrochloric acid in such amounts that the concentrations of sulfuric acid were adjusted to 0.05, 0.09, 0.18, and 0.91 meq/liter.

A sample was taken from each aqueous hydrogen peroxide solution at the outlet of the second column 0.5 hour after the start of the flow of the solution. Si and metals contained in the sample solutions of hydrogen peroxide after the flow through the columns were analyzed. The contents of Si in the solutions after the flow through the columns are shown in Table 4. The solutions contained 0.1 ppb or less each of metals other than Si and 3 ppb or less of $SO_4$ ion. Thus, the obtained solutions were found to be aqueous hydrogen peroxide solutions containing a reduced amount of Si.

TABLE 4

| amount of added $H_2SO_4$ (meq/liter) | Si in the aq. soln. of $H_2O_2$ after flow through columns (ppb) | fraction of removed Si (%) |
|---|---|---|
| 0.05 | 2.4 | 38.5 |
| 0.09 | 2.0 | 48.7 |
| 0.18 | 1.1 | 71.8 |
| 0.91 | 0.7 | 82.1 |

COMPARATIVE EXAMPLE 4

A strongly acidic cation exchange resin PK228 (H-type) produced by MITSUBISHI CHEMICAL CORPORATION, Ltd. in an amount of 5 ml was mixed with 5 ml of a resin in the bicarbonate form which was prepared by converting a strongly basic anion exchange resin PA318 in the chloride form (quaternary ammonium I type) produced by MITSUBISHI CHEMICAL CORPORATION, Ltd. under a specific condition. The prepared mixed resin was packed into a column made of Teflon and having an inside diameter of 10 mm.

The prepared column was washed with ultra-pure water at a speed of 500 ml/Hr for 1 hour. Hydrochloric acid in an amount to adjust the concentration in the resultant solution to 0.25 meq/liter was added to a crude 31% aqueous hydrogen peroxide solution containing 3.9 ppb of Si, 70 ppb of Al, and 1 ppb or less each of Na, Fe, and other metals. The prepared aqueous hydrogen peroxide solution containing hydrochloric acid was passed through the above-prepared column at a temperature of 1° C. at a speed of 500 ml/Hr for 1.5 hours.

A sample was taken from the aqueous hydrogen peroxide solution at the outlet of the column 0.5 hour after the start of the flow of the solution. Si and metals contained in the sample of hydrogen peroxide solution after the flow through the column were analyzed. The content of Si in the solution after the flow through the column was 3.9 ppb and showed no decrease from the original value. The solutions contained 0.1 ppb or less each of metals other than Si and 3 ppb or less of chlorine ion.

COMPARATIVE EXAMPLE 5

The same procedures as those conducted in Comparative Example 4 were conducted except that the strongly acidic cation exchange resin PK228 (H-type) produced by MITSUBISHI CHEMICAL CORPORATION, Ltd. in an amount of 5 ml was mixed with 5 ml of a resin in the hydroxide form which was prepared by converting the strongly basic anion exchange resin PA318 in the chloride form (quaternary ammonium I type) produced by MITSUBISHI CHEMICAL CORPORATION, Ltd. under a specific condition, and the prepared mixed resin was packed into a column made of Teflon and having an inside diameter of 10 mm.

A sample was taken from the aqueous hydrogen peroxide solution at the outlet of the column 0.5 hour after the start of the flow of the solution. Si and metals contained in the sample of hydrogen peroxide solution after the flow through the column were analyzed. The content of Si in the solution after the flow through the column was 4.0 ppb and showed no decrease from the original value. The solutions contained 0.1 ppb or less each of metals other than Si and 3 ppb or less of chlorine ion.

What is claimed is:

1. A process for producing a purified aqueous hydrogen peroxide solution comprising contacting an aqueous hydrogen peroxide solution containing impurities including silicon, and containing 15% or more by weight of hydrogen peroxide, firstly with a strongly acidic cation exchange resin having a sulfonic acid group, secondly, with an anion exchange resin in a fluoride form, and thirdly with an anion exchange resin in a bicarbonate form.

2. The process according to claim 1 wherein the aqueous hydrogen peroxide solution containing impurities contains 15 to 40% by weight of hydrogen peroxide.

3. The process according to claim 1, wherein the aqueous hydrogen peroxide solution contains 20 to 40% by weight of hydrogen peroxide.

4. A process for producing a purified aqueous hydrogen peroxide solution comprising adding an acid having an acid dissociation constant, pKa, of 5 or less in water to an aqueous hydrogen peroxide solution containing impurities including silicon, and containing 15% or more by weight of hydrogen peroxide, the acid being added in an amount so that the concentration of the acid is 0.005 to 5 meq/liter and contacting the resultant aqueous solution with an anion exchange resin in the fluoride form.

5. The process according to claim 4, wherein the process is carried out at a temperature of 30° C. or lower.

6. The process according to claim 5 wherein the aqueous hydrogen peroxide solution containing impurities contains 15 to 40% by weight of hydrogen peroxide.

7. The process according to claim 4, wherein the process is carried out at a temperature of −10° to 20° C.

8. The process according to claim 4, wherein the acid is selected from the group consisting of hydrochloric acid, sulfuric acid, nitric acid, phosphoric acid, hydrofluoric acid, chlorous acid, phosphinic acid, phosphonic acid, diphosphoric acid, tripolyphosphoric acid, formic acid, acetic acid, chloroacetic acid, fluoroacetic acid, oxalic acid, benzoic acid, an organic phosphonic acid and an organic sulfonic acid.

9. The process according to claim 4 wherein the aqueous hydrogen peroxide solution containing impurities contains 15 to 40% by weight of hydrogen peroxide.

* * * * *